(12) United States Patent
Davis et al.

(10) Patent No.: US 8,407,712 B2
(45) Date of Patent: Mar. 26, 2013

(54) UPDATING WORKFLOW NODES IN A WORKFLOW

(75) Inventors: Matthew Scott Davis, Durham, NC (US); David Robert Draeger, Rochester, MN (US); Howard Justin Glaser, San Jose, CA (US); James Andrew McCright, Rochester, MN (US); Russell Blake Wright, Bar Harbor, ME (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 11/849,197

(22) Filed: Aug. 31, 2007

(65) Prior Publication Data

US 2009/0064171 A1 Mar. 5, 2009

(51) Int. Cl.
*G06F 9/46* (2006.01)
(52) U.S. Cl. ........................................ 718/106
(58) Field of Classification Search .................. 718/106
See application file for complete search history.

(56) References Cited

U.S. PATENT DOCUMENTS

| | | | |
|---|---|---|---|
| 5,958,003 A | 9/1999 | Preining et al. | |
| 6,601,035 B1 | 7/2003 | Panagos et al. | |
| 7,624,194 B2* | 11/2009 | Kakivaya et al. | 709/243 |
| 2002/0055939 A1 | 5/2002 | Nardone et al. | |
| 2003/0084016 A1 | 5/2003 | Norgaard et al. | |
| 2004/0019512 A1* | 1/2004 | Nonaka | 705/8 |
| 2004/0133660 A1* | 7/2004 | Junghuber et al. | 709/219 |
| 2004/0199881 A1 | 10/2004 | Ghosh et al. | |
| 2005/0004928 A1 | 1/2005 | Hamer et al. | |
| 2005/0108418 A1 | 5/2005 | Bedi et al. | |
| 2005/0182749 A1* | 8/2005 | Matsui | 707/1 |
| 2005/0234984 A1 | 10/2005 | Rogerson et al. | |
| 2006/0004614 A1 | 1/2006 | Hutchinson et al. | |
| 2006/0010025 A1 | 1/2006 | Sattler et al. | |
| 2006/0085412 A1 | 4/2006 | Johnson et al. | |
| 2006/0167730 A1 | 7/2006 | Calderone et al. | |
| 2006/0190535 A1 | 8/2006 | Kaitaniemi et al. | |
| 2006/0235737 A1 | 10/2006 | Fleurant et al. | |
| 2006/0235738 A1 | 10/2006 | Doyle et al. | |
| 2006/0271927 A1* | 11/2006 | Morales et al. | 717/171 |

(Continued)

OTHER PUBLICATIONS

Feedstream Inc., "FeedStream QDoX 5.0", [online], Mar. 1, 2004, available on the Internet at <URL: http://www.feedstream.com/default/downloads/pdf/QDoX-Capabilities-Features.pdf>, 3 pp.

(Continued)

*Primary Examiner* — Li B Zhen
*Assistant Examiner* — Bradford Wheaton
(74) *Attorney, Agent, or Firm* — David W. Victor; Konrad, Raynes, Davda & Victor LLP

(57) ABSTRACT

Provided a method, system, and article of manufacture for updating workflow nodes in a workflow. A workflow program processes user input at one node in a workflow comprised of nodes and workflow paths connecting the nodes, wherein the user provides user input to traverse through at least one workflow path to reach the current node. The workflow program transmits information on a current node to an analyzer. The analyzer processes the information on the current node to determine whether there are modifications to at least one subsequent node following the current node over at least one workflow path from the current node. The analyzer transmits to the workflow program an update including modifications to the at least one subsequent node in response to determining the modifications.

25 Claims, 6 Drawing Sheets

U.S. PATENT DOCUMENTS

| | | |
|---|---|---|
| 2006/0277166 A1 | 12/2006 | Vogler-Ivashchanka et al. |
| 2007/0011334 A1 | 1/2007 | Higgins et al. |
| 2007/0011613 A1 | 1/2007 | Lane et al. |
| 2007/0240099 A1 | 10/2007 | Jahn et al. |
| 2009/0064130 A1 | 3/2009 | Davis et al. |

OTHER PUBLICATIONS

US Patent Application, filed on Aug. 31, 2007, entitled "Updating a Workflow When a User Reaches an Impasse in the Workflow", invented by M.S. Davis, D.R. Draeger, and R.B. Wright.

Vignette Corp., "Vignette Process Workflow Modeler", May 2003, 4 pp.

Yang, Y., "Enabling Cost-Effective Light-Weight Disconnected Workflow for Web-Based Teamwork Support", Journal of Applied Systems Studies, vol. 3, No. 2, 2002, pp. 437-453.

Office Action 1, Sep. 2, 2011, for U.S. Appl. No. 11/849,187, Total 22 pp.

Final Office Action 1, Feb. 21, 2012 for U.S. Appl. No. 11/849,187, filed Aug. 31, 2007 by M.S. Davis et al., Total 20 pp. [57.109 (FOA1)].

Amendment 1, Dec. 2, 2011, for U.S. Appl. No. 11/849,187, filed Aug. 31, 2007 by M.S. Davis et al., Total 13 pp. [57.109 (Amend1)].

Amendment 2, May 1, 2012, for U.S. Appl. No. 11/849,187, filed Aug. 31, 2007 by M.S. Davis et al., Total 13 pp. [57.109 (Amend2)].

Preliminary Amendment, Jun. 9, 2011, for U.S. Appl. No. 13/619,846, filed Sep. 14, 2012 by M.S. Davis et al., Total 18 pp. [57.109C1 (PrelimAmend)].

U.S. Appl. No. 13/619,846, filed Sep. 14, 2012, entitled "Updating a Workflow When a User Reaches an Impasse in the Workflow", invented by Davis, M.S., D.R. Draeger, and R.B. Wright, Total 26 pp. [57.109C1 (Appln)].

Notice of Allowance, Oct. 16, 2012, for U.S. Appl. No. 11/849,187, filed Aug. 31, 2007 by M.S. Davis et al., Total 18 pp. [57.109 (NOA)].

Supplemental Notice of Allowability, Dec. 7, 2012, for U.S. Appl. No. 11/849,187, filed Aug. 31, 2007 by M.S. Davis et al., Total 11 pp. [57.109 (SuppNtcAllowability)].

\* cited by examiner

UPDATING WORKFLOW NODES IN A WORKFLOW

FIELD

The present invention relates to a method, system, and article of manufacture for updating workflow nodes in a workflow.

DESCRIPTION OF THE RELATED ART

A workflow defines a series of processes to be performed by one or more users at client computers. The user activities at the client computers may involve updating an electronic form, reviewing information, troubleshooting a technical program with a device, program or other problem, entering input, executing a program, etc. After a user performs a specified action at a node in the workflow, the workflow program, or workflow engine, may traverse to a next node in the workflow based on the input the user supplied. The workflow may specify that a same or different user perform operations at a next node in the workflow.

For users traversing a workflow, there exists the potential for the user to reach an impasse where the workflow does not account for the particular needs of the user's particular situation. Upon reaching an impasse, the user may access an updated workflow over a network and download the revised workflow. This requires the user to exit the workflow, download the new workflow and update the workflow with the new workflow. However, the user cannot be assured that the new workflow addresses the reasons for user's particular impasse.

The user may also access and run the workflow over a network, so that the user is accessing the most current version of the workflow. This solution requires that the user work on-line to access the workflow There is a need in the art for improved techniques for updating a workflow.

SUMMARY

Provided a method, system, and article of manufacture for updating workflow nodes in a workflow. A workflow program processes user input at one node in a workflow comprised of nodes and workflow paths connecting the nodes, wherein the user provides user input to traverse through at least one workflow path to reach the current node. The workflow program transmits information on a current node to an analyzer. The analyzer processes the information on the current node to determine whether there are modifications to at least one subsequent node following the current node over at least one workflow path from the current node. The analyzer transmits to the workflow program an update including modifications to the at least one subsequent node in response to determining the modifications.

DETAILED DESCRIPTION

Figure 1:
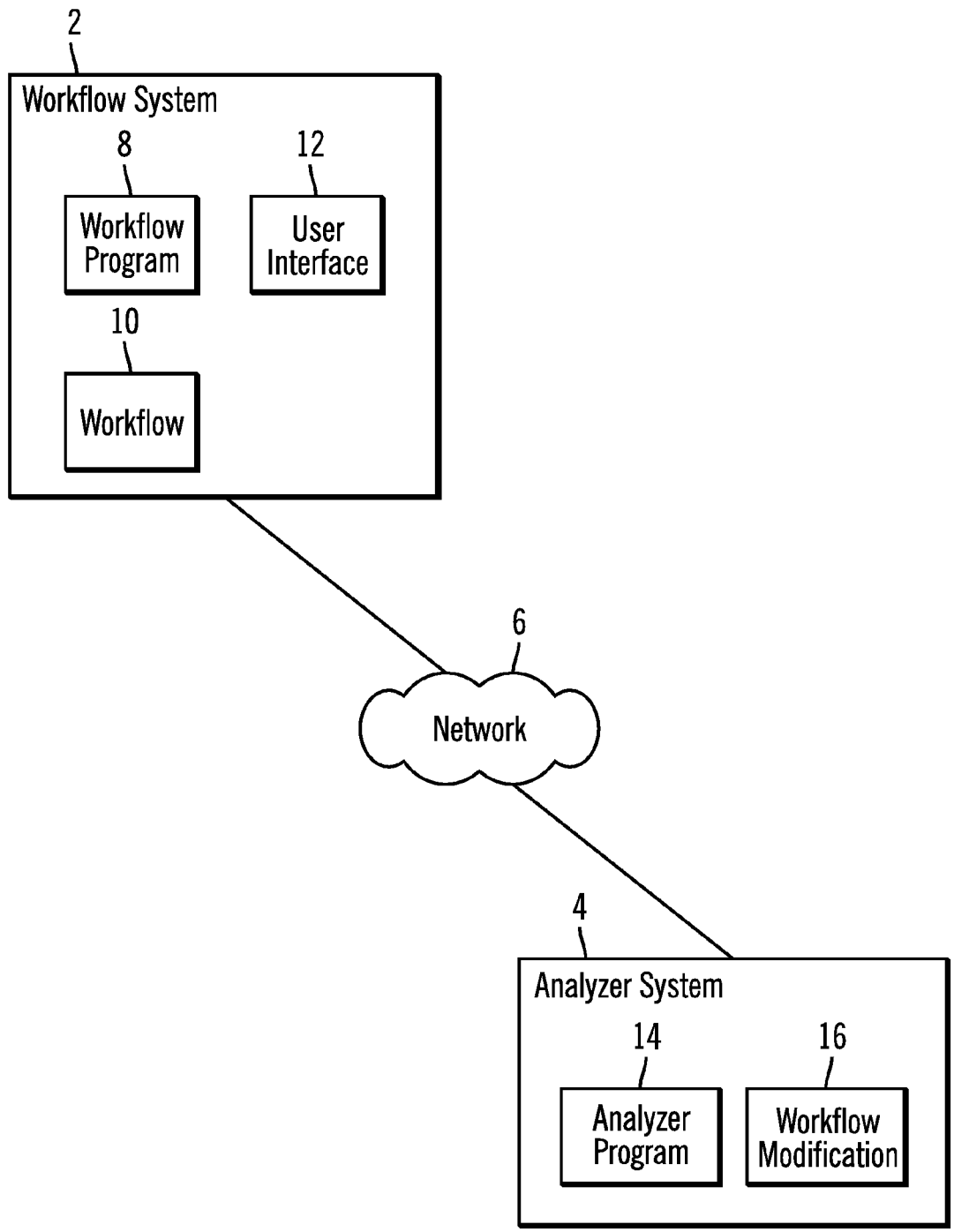
FIG. 1 illustrates an embodiment of a computing environment.

FIG. 1 illustrates a computing environment in which embodiments may be implemented. A workflow system 2 is in communication with an analyzer system 4 over a network 6. The workflow system 2 includes a workflow program 8, such as a workflow engine, that processes a workflow 10 to interpret and execute the process defined by the workflow 10. The workflow 10 comprises a plurality of nodes, where user input to perform an operation at a node determines the transition to a subsequent node in the workflow to perform further operations or obtain information. The workflow program 8 generates a user interface 12 to display information on the workflow and receive user input at a node in the workflow which may determine the workflow path defined in the workflow 10 that the workflow program 8 selects to transition to a next node, which may have yet further transitions to additional nodes or define an exit or final node of the workflow.

The workflow 10 may define a process to diagnose a technical problem with a device or program, or to perform an operation to implement a business process, such as enter customer information, process a sales order, process a customer request, etc. The operations performed at nodes in the workflow may be performed by workflow participants at client computers in a network environment or by one user. One or more actions and a user may be associated with the work nodes in the workflow. The work nodes defined for the workflow may comprise a decision point node, collection point node, document node, and assign value node. A decision point node causes the workflow to proceed along a branch of execution based on selection by the user or some other action taken by an external application called at a previous work node. For instance, the path taken to the next node in the workflow may vary depending on the user input. At a node, the user may perform various operations, such as enter input, invoke a program, create or revise a document, etc. The input the user provides or output generated at a node may determine the workflow path transition to a next node.

If the workflow program 8 processes a current node or point in the workflow 10, then the workflow program 8 may communicate the current node to the analyzer program 14 over the network 6. The analyzer program 14 may then determine whether there are any modifications 16 to the workflow 10 at a fixed number of nodes from the current node. The modifications 16 comprise changes to nodes in the workflow 10, which may comprise modifications in later versions of the workflow 10 the workflow program 8 is processing.

Figure 2:
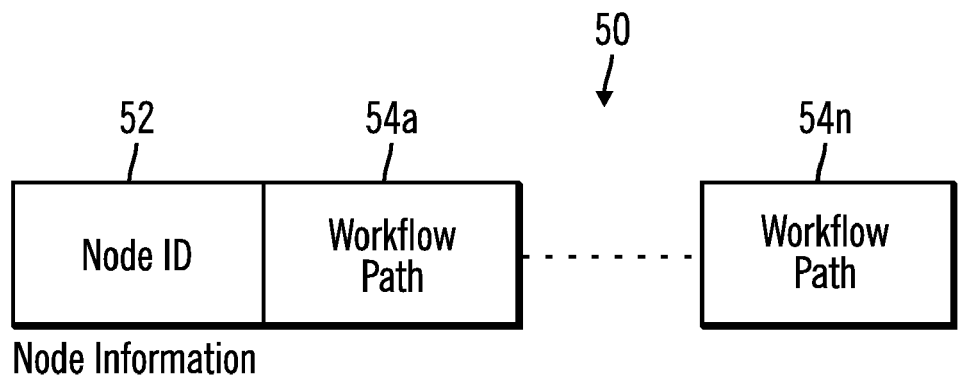
FIG. 2 illustrates an embodiment of node information.

FIG. 2 illustrates an embodiment of node information 50 maintained for the nodes in the workflow 50. The node information 50 for one node may include a node identifier 52 and one or more workflow paths 54a . . . 54n defining transitions to next nodes in the workflow 10.

Figure 3:
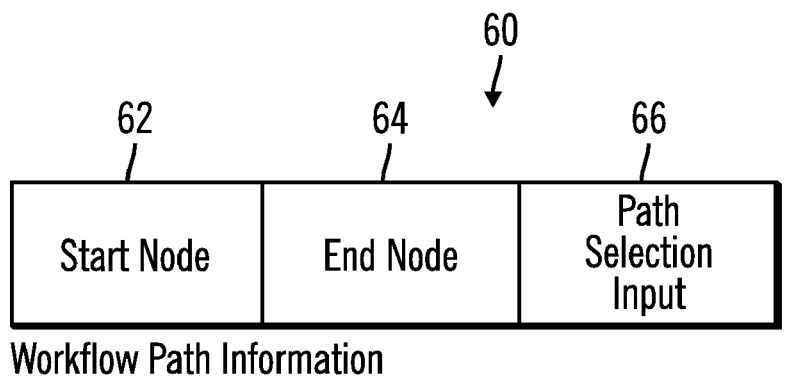
FIG. 3 illustrates an embodiment of workflow path information.

FIG. 3 illustrates an embodiment of workflow path information 60 provided for the workflow paths 54a . . . 54n defined for one node 50, which may include a start node 62 indicating the node from which the path extends and an end node 64 comprising the node to which the path transitions. Path selection input 66 indicates the user input that causes the transition from the start node 62 to the end node 64. Thus, if a node 50 is defined to include multiple workflow paths 54a . . . 54n, then the user input is compared to the path selection input 66 to determine the workflow path 54a . . . 54n used for the transition to the end node 64 of the determined workflow path 60.

The node information described with respect to FIGS. 2 and 3 may be arranged and organized in a different manner in a workflow 10 than shown in FIGS. 2 and 3.

Figure 4:
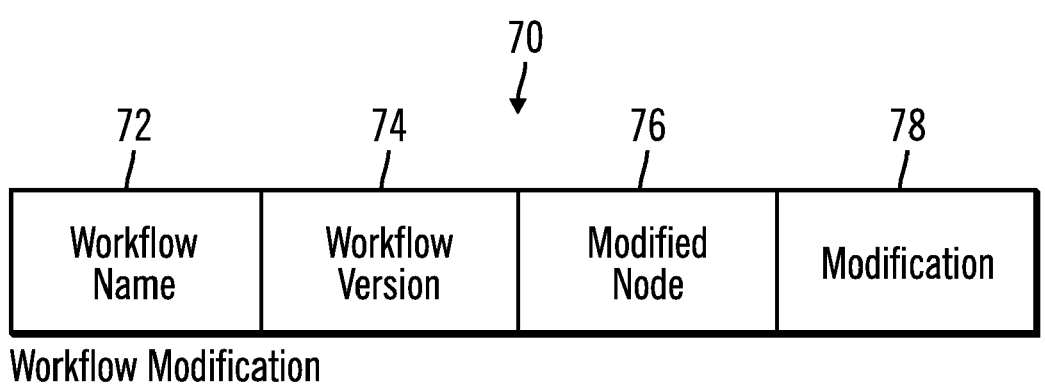
FIG. 4 illustrates an embodiment of a workflow modification.

FIG. 4 illustrates an embodiment of a workflow modification 70, where the workflow modification 16 may be comprised of a plurality of workflow modification 70 instances. The workflow modification 70 information may include a workflow name 72 and a workflow version 74 which includes the modification; the modified node 76 affected by the modification; and the modification 78. The modifications 78 may comprise one or more new nodes and workflow paths at the node 76, a modified workflow path at the node 76, a deletion of a workflow path at the node, different information to present at the node 76, different operations to perform at the node, etc.

Figure 5:
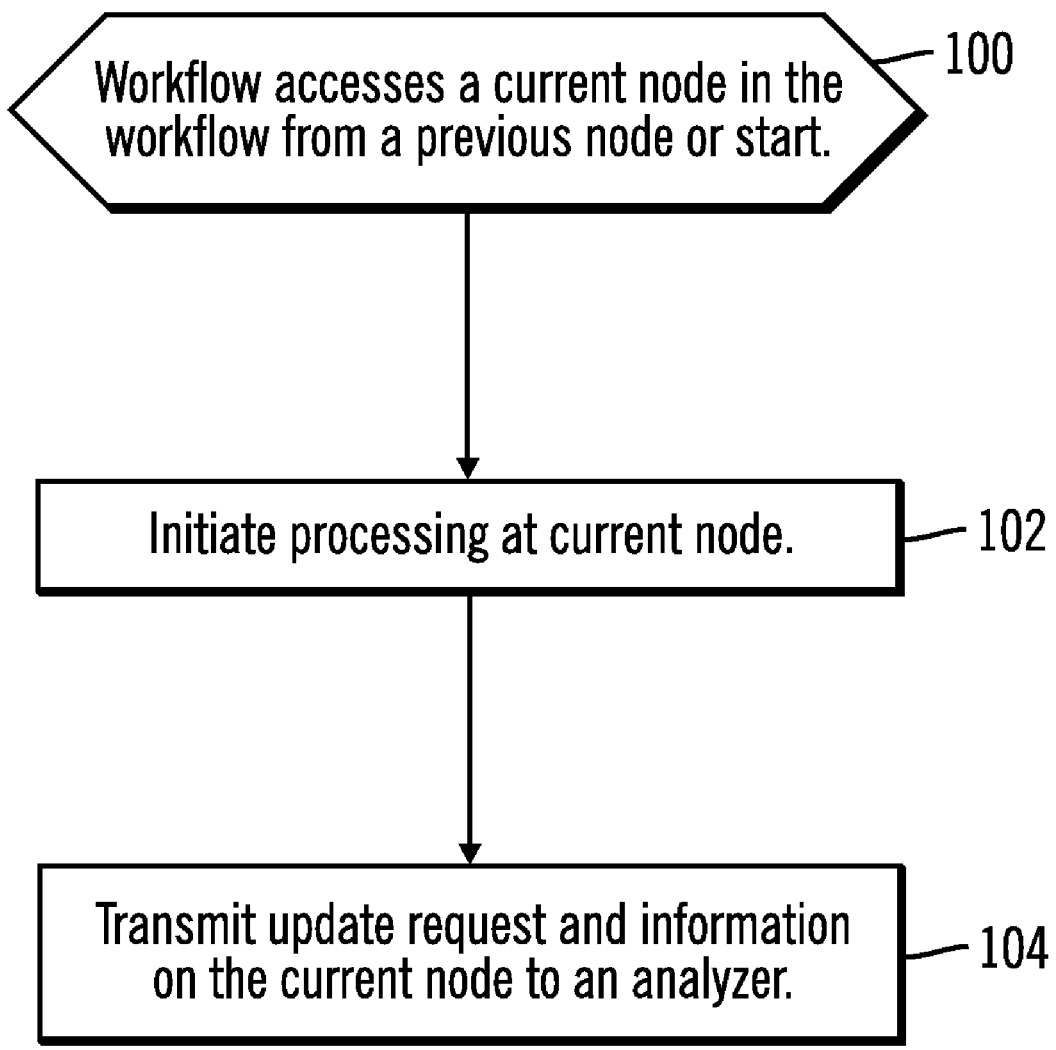
FIG. 5 illustrates an embodiment of operations to process a workflow at a node.

FIG. 5 illustrates an embodiment of operations performed by the workflow program 8 to process user input at a node. Upon accessing (at block 100) a current node in the workflow 10 by traversing from a previous node or the start node, the workflow program 8 initiates (at block 102) processing at the node and transmits (at block 104) an update request and information on the current node to the analyzer program 14. In the embodiment of FIG. 5, the update request with current node is sent in response to initiating processing at a node. In alternative embodiments, the update request and current node may be transmitted while processing at the current node. Yet further, the current node indicated in the update request may comprise a node following the node at which the user is currently working in the workflow.

Figure 6:
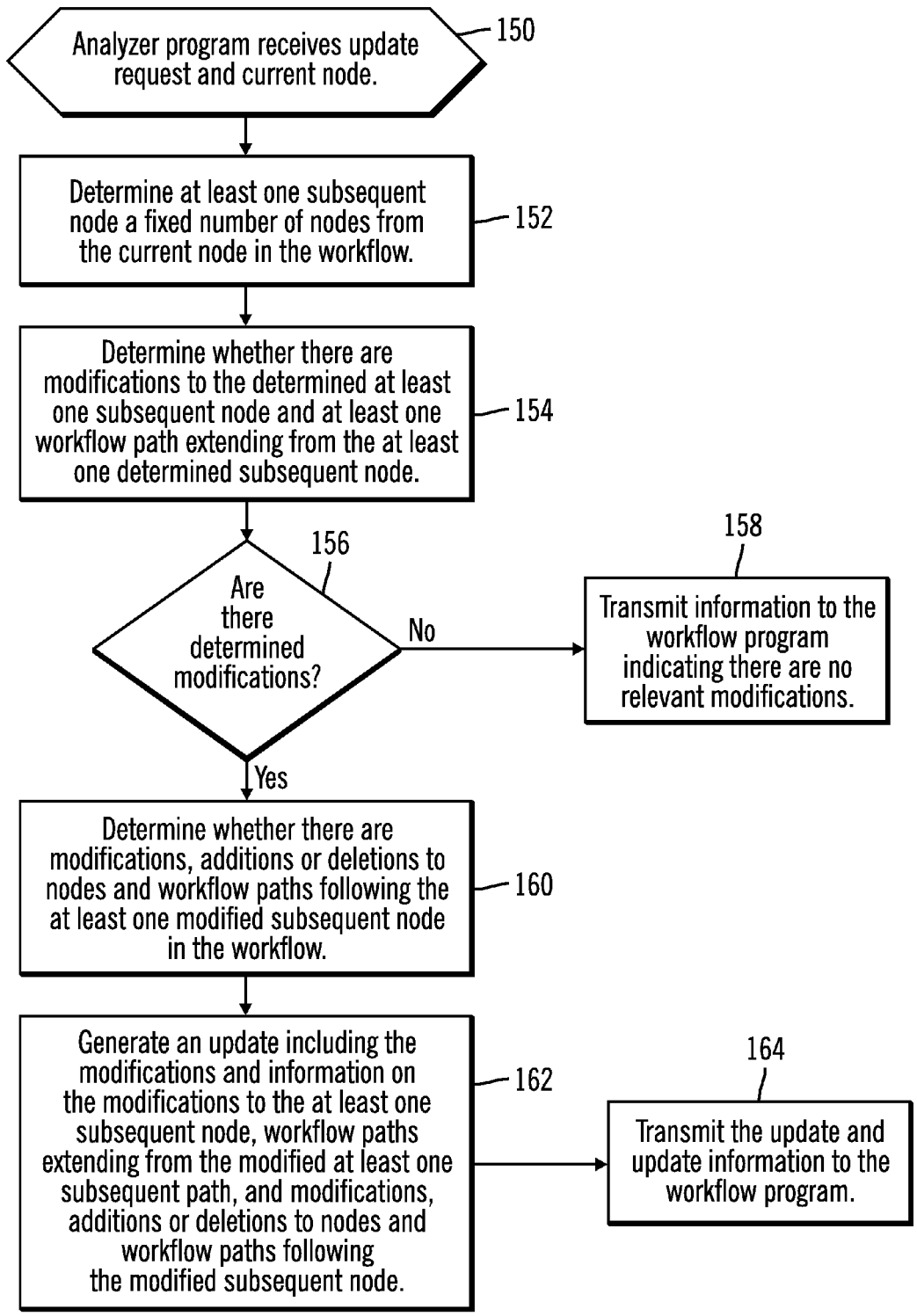
FIG. 6 illustrates and embodiment of operations to process an update request for a current node.

FIG. 6 illustrates an embodiment of operations the analyzer program 14 performs to determine whether there are workflow modifications 16 to nodes following the current node in the workflow 10. Upon receiving (at block 150) an update request and the current node from the workflow program 8, where the analyzer program 14 may receive update requests from workflow programs on different workflow systems 2 in the network 6, the analyzer program 14 determines (at block 152) from the workflow 10 at least one subsequent node a fixed number of nodes from the current node in the workflow. There may be a multiple number of subsequent nodes a fixed number of nodes from the current node down different workflow paths extending from the current node. The analyzer program 14 determines (at block 154) whether there are modifications to the determined at least one subsequent node and at least one workflow path extending from the at least one determined subsequent node. If (at block 156) there are no determined modifications, then the analyzer program 14 transmits (at block 158) information to the workflow program 8 indicating there are no modifications. Alternatively, the analyzer program 14 may return nothing in response to the update request if there are no determined modifications.

If (at block 156) there are modifications with respect to the at least one subsequent node, a fixed number of nodes from the current node, then the analyzer program 14 may determine (at block 160) whether there are modifications, additions or deletions to nodes and workflow paths following the at least one modified subsequent node in the workflow 10. The analyzer program 14 then generates (at block 162) an update including the modifications and information on the modifications to the at least one subsequent node, workflow paths extending from the modified at least one subsequent node, and modifications, additions or deletions to nodes and workflow paths following the modified subsequent node. The modifications and update information are transmitted (at block 162) to the workflow program 8.

In the embodiment of FIG. 6, the analyzer program 14 determines (at block 160) modifications to nodes and workflow paths following the modified subsequent node a fixed number of nodes following the current node. In one embodiment, the analyzer program 14 may determine only modifications a fixed number of nodes following the modified subsequent node, where the modified subsequent node is a fixed number of nodes from the current node. The fixed number of nodes of a subsequent node from the current node may be different or same as the fixed number of nodes from the modified subsequent node for which modifications to nodes and workflow paths are provided at block 160. In a still further embodiment, the analyzer program 14 may only provide modifications to the subsequent nodes and workflow paths a fixed number of nodes from the current node and may not provide modifications to nodes following the modified subsequent nodes.

Figure 7:
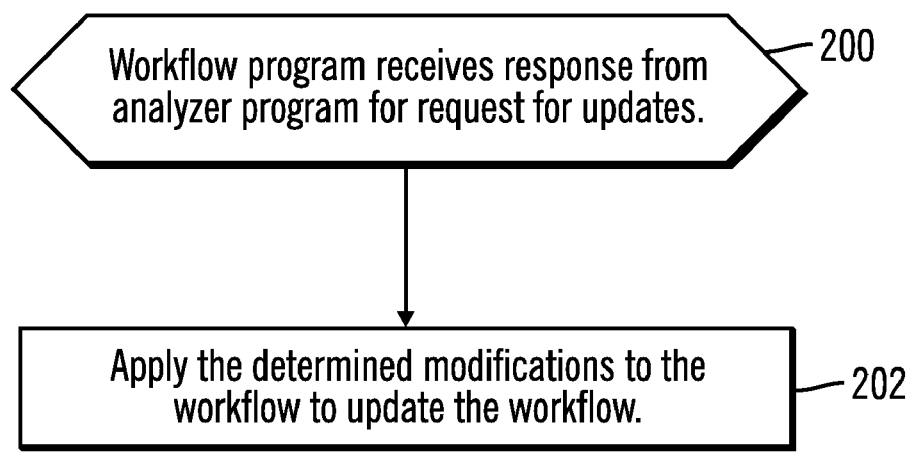
FIG. 7 illustrates an embodiment of operations to process received modifications to a workflow.

FIG. 7 illustrates an embodiment of operations performed by the workflow program 8 in response to receiving updates or other information from the analyzer program 14. Upon the workflow program 8 receiving (at block 200) a response from the analyzer program 14 to the request for updates, the workflow program 8 applies (at block 260) the determined modifications 70 in the received updates to the workflow 10 to update the workflow 10. In certain embodiments, the user may continue working at the current node of the workflow while the workflow program 8 is applying the update and modifications to the at least one modified subsequent node and any other nodes following the node at which the user is working, which may comprise the current node.

In one embodiment, the subsequent node may be two or more nodes from the current node at which the user is working. In such case, the user may have moved to one node following the current node before the updates and modifications are applied. If this occurs, then in certain embodiments, the user may continue working at the node following the current node while updates and modifications are applied to nodes following the current node. However, the user may be prevented from working at a node that is in the process of being modified and updated and may have to wait until the modification or update is complete before continuing.

The described embodiments provide techniques to update nodes in a workflow beyond the current node, which may comprise the node at which the user is currently working or some following node. By the time the user reaches the subsequent nodes subject to the updates, such modifications and updates will have been applied so that the user continues through the most up-to-date version of the workflow nodes. Further, by applying updates to only modified nodes following the current node, which is at or following the node at which the user is working, the update process does not interfere with the current operations the user is performing and the number and amount of updates and modifications is minimized to increase the speed at which the updates and modifications are downloaded and applied to the workflow to further minimize the likelihood the update and modification process will interfere with the user's traversal through the workflow.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 8:
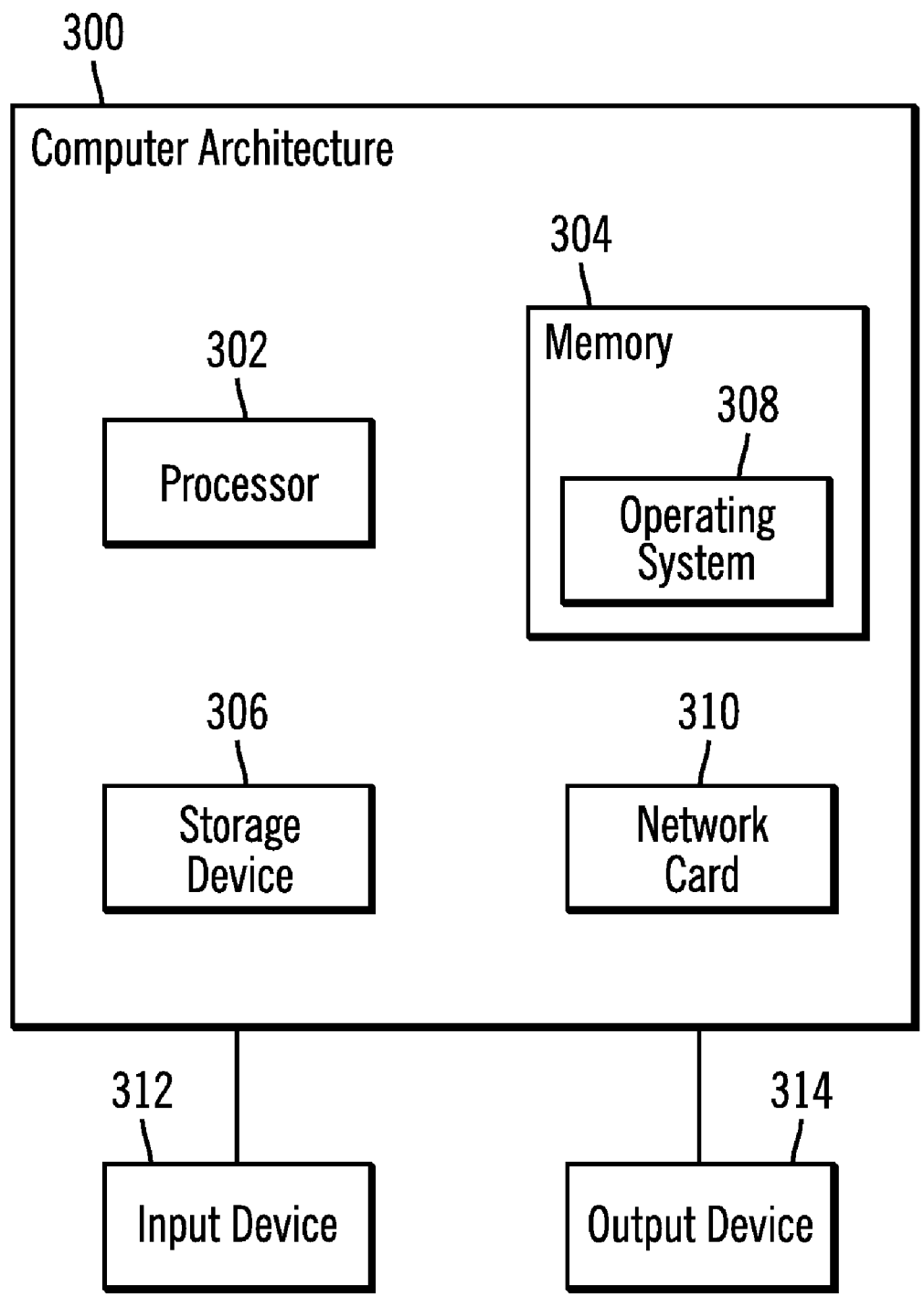
FIG. 8 illustrates an embodiment of a computer architecture that may be used with the systems in FIG. 1.

FIG. 8 illustrates one implementation of a computer architecture 300 that may be implemented in the workflow 2 and analyzer 4 systems of FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308, device drivers and application programs, in the storage 306 are loaded into the memory 304 and executed by the processor 302 in a manner known in the art. The architecture further includes a network card 310 to enable communication with a network. An input device 312 is used to provide user input to the processor 312, and may include a keyboard, mouse, pen-stylus, microphone, touch sensitive display screen, or any other activation or input mechanism known in the art. An output device 314 is capable of rendering information transmitted from the processor 312, or other component, such as a display monitor, printer, storage, etc.

The network 6 may comprise a Wide Area Network (WAN), Local Area Network (LAN), Storage Area Network (SAN), wireless network, the Internet, an Intranet, peer-to-peer network, etc. Alternatively, the systems 2 and 4 may be connected via a direct cable.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising at least one of a magnetic storage medium, and optical storage, and a computer readable memory including code implementing a workflow program and analyzer to cause operations to be performed by the workflow program and the analyzer, the operations comprising:

processing, by the workflow program, user input at one node in a workflow comprised of nodes and workflow paths connecting the nodes, wherein the user provides user input to traverse through at least one workflow path to reach a current node, and wherein the current node comprises the node in the workflow at which the user is currently working;

transmitting, by the workflow program, information on the current node or a node following the current node to the analyzer in response to processing at the current node in the workflow;

maintaining a workflow modification having workflow modification instances providing changes to nodes in the workflow;

processing, by the analyzer, the workflow modification to determine whether there is at least one workflow modification instance providing modifications in the workflow to at least one subsequent node following the current node over at least one workflow path from the current node, wherein the at least one modification to the at least one subsequent node comprises modifications from a later version of the workflow to provide an up-to-date version of the workflow nodes at the at least one subsequent node; and transmitting to the workflow program, by the analyzer, an update including modifications from the determined at least one workflow modification instance to the at least one subsequent node in response to determining the modifications.

2. The article of manufacture of claim 1, wherein the update includes the modifications to at least one of the subsequent node and the at least one workflow path extending from the at least one subsequent node.

3. The article of manufacture of claim 1, wherein determining whether there are modifications comprises determining whether there are modifications to at least one workflow path extending from the at least one subsequent node, wherein the transmitted update includes the determined modifications to the at least one workflow path extending from the at least one subsequent node.

4. The article of manufacture of claim 1, wherein the transmitted update includes modifications comprising at least one of modifications, additions or deletions to nodes and workflow paths in the workflow following the at least one subsequent node for which the modifications are determined.

5. The article of manufacture of claim 1, wherein the transmitted update includes modifications comprising at least one of modifications, additions or deletions to subsequent nodes and workflow paths following the current node in the workflow, wherein the modifications are for subsequent nodes and workflow paths within a fixed number of nodes from the current node.

6. The article of manufacture of claim 1, wherein the at least one subsequent node for which the modifications are determined comprises at least one node a fixed number of nodes following the current node in the workflow.

7. The article of manufacture of claim 1, wherein the operations further comprise:

applying, by the workflow program, the determined modifications to the workflow to update the workflow, wherein the user is enabled to continue working at the current node while the determined modifications in the update are applied to the workflow.

8. The article of manufacture of claim 1, wherein the operations further comprise:

applying the update including the modification to the workflow to generate an updated workflow; and traversing from the current node to a next current node in the modified workflow, wherein an additional iteration of the operations of processing the workflow modification, transmitting the update, and applying the update including the modification are performed with respect to the next current node and the modified workflow.

9. The article of manufacture of claim 1, wherein the operations further comprise:

traversing to the at least one subsequent node to process, wherein the modifications will have been applied to the at least one subsequent node by a time the user traverses to the at least one subsequent node.

10. A system, comprising:

at least one computer readable storage device including a workflow comprised of nodes and workflow paths connecting the nodes and a workflow modification having workflow modification instances providing changes to nodes in the workflow;

an analyzer program;

a workflow program enabled to perform operations, the operations including:

processing user input at one node in a workflow comprised of nodes and workflow paths connecting the nodes, wherein the user provides user input to traverse through at least one workflow path to reach a current node, wherein the current node comprises the node in the workflow at which the user is currently working; and transmitting information on the current node or a node following the current node to the analyzer program in response to processing at the current node in the workflow; and wherein the analyzer program is enabled to perform operations, the operations including:

processing the workflow modification to determine whether there is at least one workflow modification instance providing modifications in the workflow to at least one subsequent node following the current node over at least one workflow path from the current node, wherein the at least one modification to the at least one subsequent node comprises modifications from a later version of the workflow to provide an up-to-date version of the workflow nodes at the at least one subsequent node; and transmitting to the workflow program an update including modifications from the determined at least one workflow modification instance to the at least one subsequent node in response to determining the modifications.

11. The system of claim 10, wherein the update includes the modifications to at least one of the subsequent node and the at least one workflow path extending from the at least one subsequent node.

12. The system of claim 11, wherein the operations further comprise:

traversing to the at least one subsequent node to process, wherein the modifications will have been applied to the at least one subsequent node by a time the user traverses to the at least one subsequent node.

13. The system of claim 10, wherein determining whether there are modifications comprises determining whether there are modifications to at least one workflow path extending from the at least one subsequent node, wherein the transmitted update includes the determined modifications to the at least one workflow path extending from the at least one subsequent node.

14. The system of claim 10, wherein the transmitted update includes modifications comprising at least one of modifications, additions or deletions to nodes and workflow paths in the workflow following the at least one subsequent node for which the modifications are determined.

15. The system of claim 10, wherein the transmitted update includes modifications comprising at least one of modifications, additions or deletions to nodes and workflow paths following the current node in the workflow, wherein the modifications are for subsequent nodes and workflow paths within a fixed number of nodes from the current node.

16. The system of claim 10, wherein the workflow operations further comprise:
applying the determined modifications to the workflow to update the workflow, wherein the user is enabled to continue working at the current node while the determined modifications in the update are applied to the workflow.

17. The system of claim 10, wherein the operations further comprise:
applying the update including the modification to the workflow to generate an updated workflow; and
traversing from the current node to a next current node in the modified workflow, wherein an additional iteration of the operations of processing the workflow modification, transmitting the update, and applying the update including the modification are performed with respect to the next current node and the modified workflow.

18. A method, comprising:
processing, by a workflow program, user input at one node in a workflow comprised of nodes and workflow paths connecting the nodes, wherein the user provides user input to traverse through at least one workflow path to reach a current node, and wherein the current node comprises the node in the workflow at which the user is currently working;
transmitting, by the workflow program, information on the current node or a node following the current node to an analyzer in response to processing at the current node in the workflow;
maintaining a workflow modification having workflow modification instances providing changes to nodes in the workflow;
processing, by the analyzer, workflow modification to determine whether there is at least one workflow modification instance providing modifications in the workflow to at least one subsequent node following the current node over at least one workflow path from the current node, wherein the at least one modification to the at least one subsequent node comprises modifications from a later version of the workflow to provide a most up-to-date version of the workflow nodes at the at least one subsequent node; and
transmitting to the workflow program, by the analyzer, an update including modifications from the determined at least one workflow modification instance to the at least one subsequent node in response to determining the modifications.

19. The method of claim 18, wherein the update includes the modifications to at least one of the subsequent node and the at least one workflow path extending from the at least one subsequent node.

20. The method of claim 18, wherein determining whether there are modifications comprises determining whether there are modifications to at least one workflow path extending from the at least one subsequent node, wherein the transmitted update includes the determined modifications to the at least one workflow path extending from the at least one subsequent node.

21. The method of claim 18, wherein the transmitted update includes modifications comprising at least one of modifications, additions or deletions to nodes and workflow paths in the workflow following the at least one subsequent node for which the modifications are determined.

22. The method of claim 18, wherein the transmitted update includes modifications comprising at least one of modifications, additions or deletions to subsequent nodes and workflow paths following the current node in the workflow, wherein the modifications are for subsequent nodes and workflow paths within a fixed number of nodes from the current node.

23. The method of claim 18, further comprising: applying, by the workflow program, the determined modifications to the workflow to update the workflow, wherein the user is enabled to continue working at the current node while the determined modifications in the update are applied to the workflow.

24. The method of claim 18, further comprising:
applying the update including the modification to the workflow to generate an updated workflow; and
traversing from the current node to a next current node in the modified workflow, wherein an additional iteration of the operations of processing the workflow modification, transmitting the update, and applying the update including the modification are performed with respect to the next current node and the modified workflow.

25. The method of claim 18, further comprising: traversing to the at least one subsequent node to process, wherein the modifications will have been applied to the at least one subsequent node by a time the user traverses to the at least one subsequent node.

* * * * *